(12) United States Patent
Lian et al.

(10) Patent No.: US 7,672,235 B1
(45) Date of Patent: Mar. 2, 2010

(54) SYSTEM AND METHOD FOR BUFFERING REAL-TIME STREAMING CONTENT IN A PEER-TO-PEER OVERLAY NETWORK

(75) Inventors: Chenghui Lian, Beijing (CN); Fang Dong, Beijing (CN)

(73) Assignee: Roxbeam Media Network Corporation, Road Town, Tortola (VG)

( * ) Notice: Subject to any disclaimer, the term of this patent is extended or adjusted under 35 U.S.C. 154(b) by 844 days.

(21) Appl. No.: 11/453,479

(22) Filed: Jun. 14, 2006

(51) Int. Cl.
*G01R 31/08* (2006.01)
(52) U.S. Cl. ...................... 370/230; 370/235
(58) Field of Classification Search ........... 370/230, 370/235
See application file for complete search history.

(56) References Cited

U.S. PATENT DOCUMENTS

2002/0191952 A1* 12/2002 Fiore et al. .............. 386/46
2006/0242240 A1* 10/2006 Parker et al. ............. 709/205

OTHER PUBLICATIONS

W. R. Stevens, "TCP/IP Illustrated," vol. 1, Ch. 1 et seq., Addison-Wesley (1994).
X. Zhang et al., "CoolStreaming/DONet: A Data-driven Overlay Network for Peer-to-Peer Live Media Streaming," INFOCOM 2005, 24th Ann. Jt. Conf of the IEEE Comp. and Comm. Societies, Proc. IEEE vol. 3, 13-17, pp. 2102-2111 (Mar. 2005).

* cited by examiner

*Primary Examiner*—Jason E Mattis
*Assistant Examiner*—Kibrom T Hailu
(74) *Attorney, Agent, or Firm*—Park, Vaughan & Fleming LLP

(57) ABSTRACT

One embodiment provides a system and method for synchronously buffering real-time streaming content in a peer-to-peer overlay network to improve inter-peer-node synchronization. A requesting peer node identifies a partner peer node that transiently stages content segments. The requesting peer node determines the status of its local buffer and sends a request that indicates such status to a partner peer node. After receiving the most recent segment not present in the buffer from the partner peer node, the requesting peer node transiently stages the received segments in the buffer.

8 Claims, 9 Drawing Sheets

SYSTEM AND METHOD FOR BUFFERING REAL-TIME STREAMING CONTENT IN A PEER-TO-PEER OVERLAY NETWORK

FIELD OF THE INVENTION

The present invention relates to techniques for delivering content over networks. More specifically, the present invention relates to a system and method for buffering real-time streaming content in a peer-to-peer overlay (P2P) network.

BACKGROUND

The ubiquity of Internet connectivity and the unprecedented growth in network access bandwidth have been fueling the demand for more versatile forms of on-line content. Currently, video is one of the most bandwidth-demanding forms of on-line content. Traditionally, video is broadcast over cable programming networks and successful delivery of high-quality video over an Internet connection is subject to several service constraints. Recent technologies, such as ADSL, VDSL, direct Ethernet connection, and WLAN, have largely removed the access bandwidth bottleneck. Server overloading and network congestion, however, can still pose potential service constraints.

Peer-to-peer overlay (P2P) networks have attracted growing interest as one solution to delivering video content. A P2P network operates over a conventional network-layer infrastructure, such as the Internet, and peer nodes are "aware" of the states of other peer nodes. Content delivery is not undertaken by one particular server. Instead, a group of peer nodes directly exchange data or services among themselves. Thus, P2P networks provide a favorable environment for delivering streaming data, such as video, because server overloading is avoided and network congestion is reduced. P2P networks also scale gracefully as the number of users increases.

P2P applications for streaming content delivery typically use a sliding-window buffering mechanism to ensure smooth playback. The use of a buffer, however, can cause startup latency, which can be significant if the buffer size is large, or if the network condition is poor. A lack of inter-peer-node synchronization can also cause delay and deteriorate streaming quality. A requesting peer node typically requests data from partner peer nodes to fill the buffer in the same order as the data arrives at the partner peer node. The requesting peer node requests the earliest available data for the streaming content first. While the requesting peer node is receiving the requested content, the sending peer node might have to advance its sliding-window buffer to receive other incoming content from the P2P network. As a result, the requesting peer node could experience a time lag with the received content, because the latest received content at the receiving peer node is always lagging behind the latest available content at the sending peer node due to the delay incurred in the data transfer.

Moreover, when content is copied and shared multiple times, the accumulated time lag can be significant and prevent real-time streaming. The accumulated lack of synchronization among different peer nodes can further impair a P2P network's ability to share data because the content commonly shared in peer nodes' buffers can be significantly reduced due to the sliding windows.

Hence, a need arises for a system and method for buffering real-time streaming content in a P2P network while minimizing lag time experienced by the peer nodes sharing common content.

SUMMARY OF THE INVENTION

Synchronization between a requesting peer node and a partner peer node is improved for real-time streaming media delivery in a P2P network. A requesting peer node identifies a partner peer node that transiently stages content segments. The requesting peer node determines the status of the local buffer, and sends a request that indicates the status to the partner peer node. The receiving peer node receives from the partner peer node the most recent segment available in the partner peer node's buffer, but not present in the requesting peer node's buffer. The requesting peer node transiently stages the received segment in the buffer.

In a further embodiment, a partner peer node receives a request that indicates a status of a buffer of a requesting peer node, and sends to the requesting peer node the most recent segment that is available in the partner peer node's buffer, but not present in the requesting peer node's buffer.

Still other embodiments will become readily apparent to those skilled in the art from the following detailed description, wherein are described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Delivery of TV Signals Over Cable Programming Networks

Figure 1:
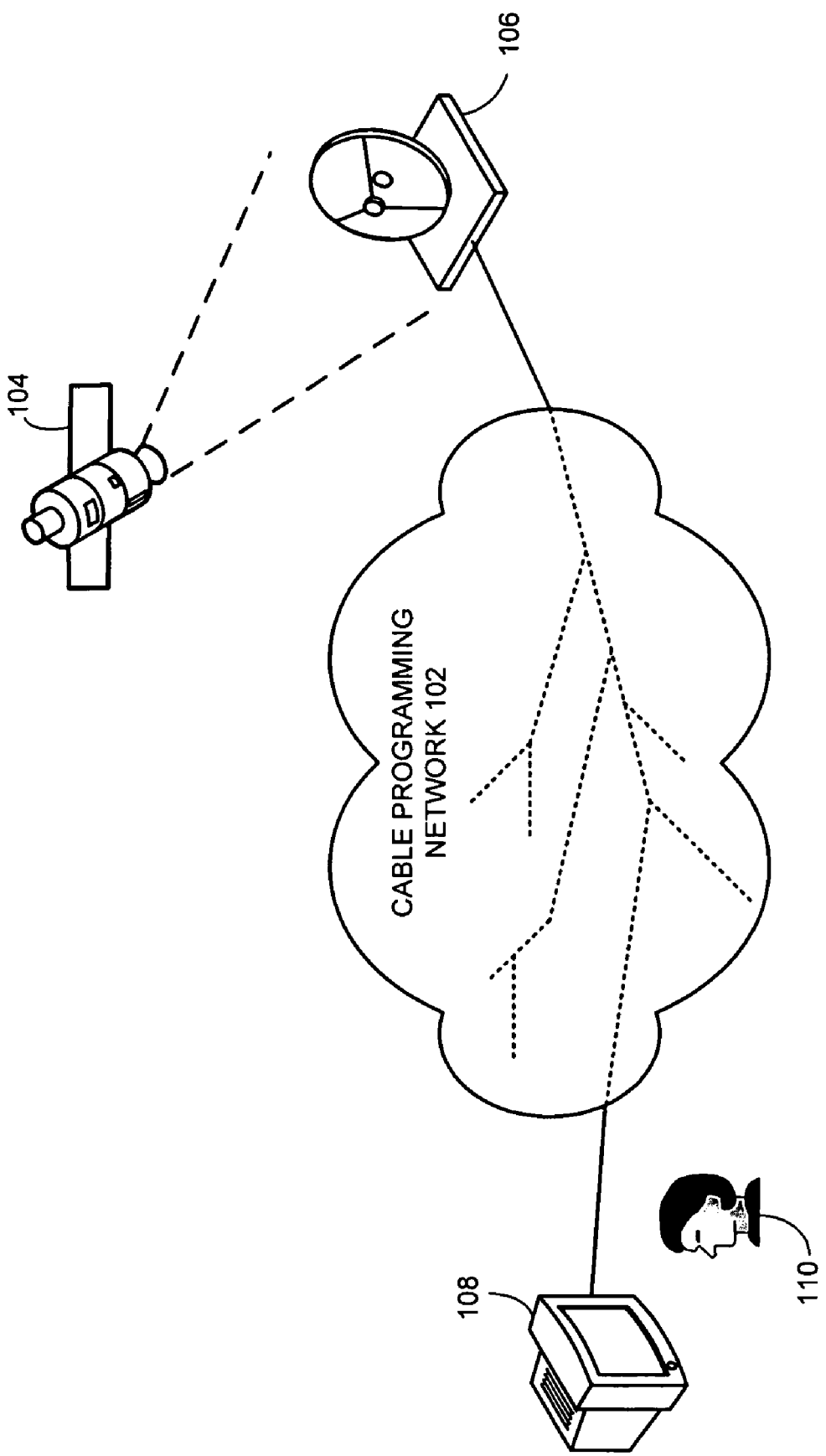
FIG. 1 is a block diagram showing a prior-art conventional cable programming network, which is used to deliver TV signals to end-users.

FIG. 1 illustrates a prior-art conventional cable programming network 102 for delivering TV signals to end-users. The head-end of a cable programming network 102 is in communication with a satellite base station 106. The base station 106 receives signals for several TV channels relayed by a satellite 104. The base station 106 also encodes the received TV signals and transmits the signals onto the cable programming network 102. A TV set or receiver 108 receives the TV signals and presents the media content.

There may be millions of end-users throughout the cable network 102 receiving the same channel simultaneously and the cable network is designed to minimize the latency in delivering TV programs to end-users. In contrast, delivering real-time content, such as live TV signals, over the Internet can be difficult, largely due to the irregular topology and insufficient access bandwidth, although the broadband Internet connections have greatly improved the access bandwidth recently.

The data structures, operations, and instructions described in the detailed description are typically stored on a computer readable storage medium, which may be any device or medium that can store code or data for use by a computer system. Suitable media include, but are not limited to, application specific integrated circuits (ASICs), field-programmable gate arrays (FPGAs), semiconductor memories, magnetic and optical storage devices such as disk drives, magnetic tape, CDs (compact discs), and DVDs (digital versatile discs or digital video discs). Furthermore, a computer system can be any device or system capable of processing electronically-stored data.

Receiving and Presenting P2P Streaming Media Content

Figure 2:
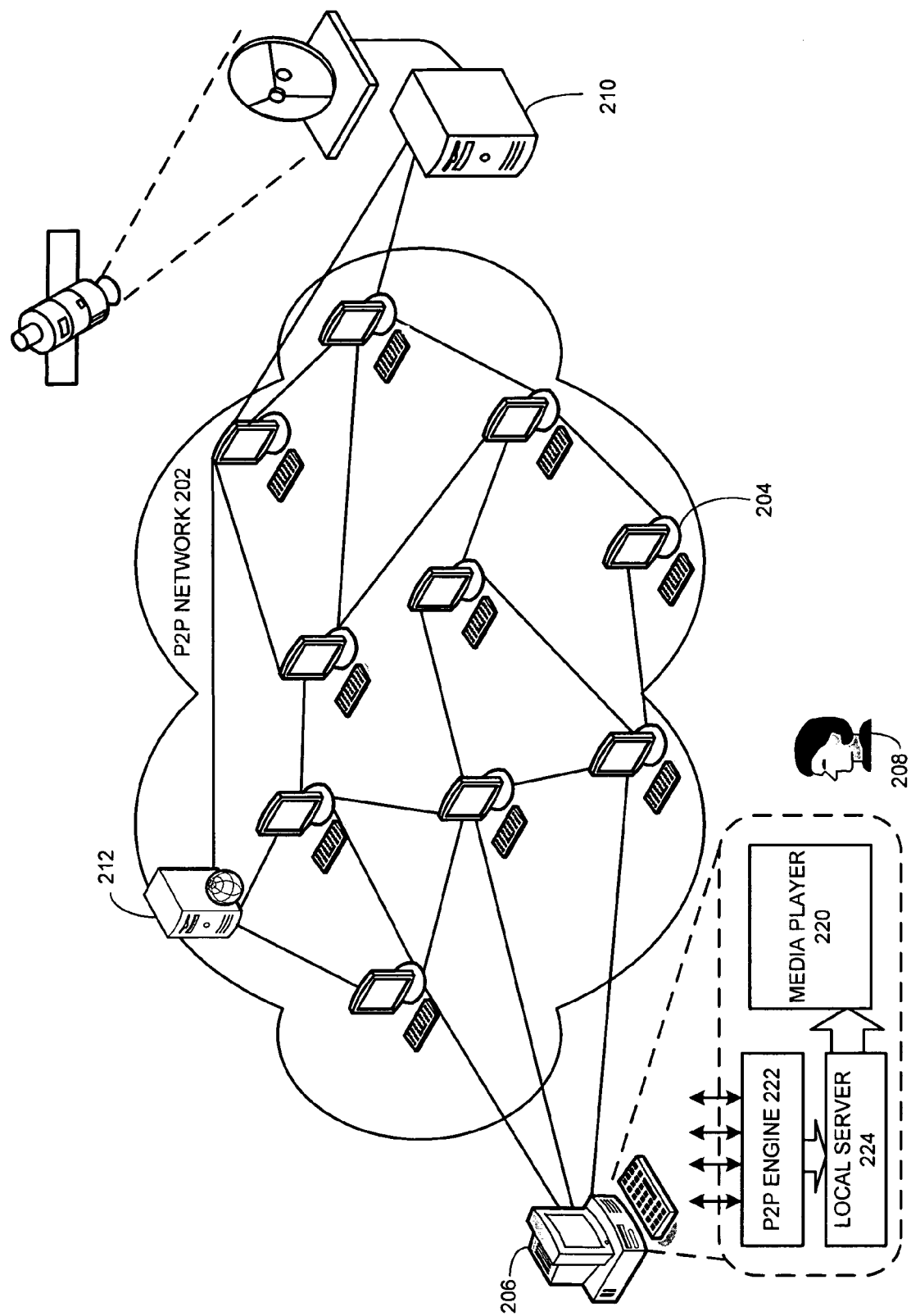
FIG. 2 is a block diagram showing a host facilitating a P2P engine and a local server for presenting streaming media content received over a P2P network, in accordance with one embodiment.

FIG. 2 illustrates a host facilitating a P2P engine and a local server for presenting streaming media content received over a P2P network. An originating node 210 is in communication with a satellite base station and receives data for media content. Peer nodes, such as computer 204, collectively form a P2P overlay network 202. A P2P network can cost-efficiently deliver bandwidth-demanding streaming media, such as audio or video, over the Internet or a wireless cellular network. A node in a P2P network actively shares locally stored data with other peer nodes by exchanging requests and data with other peer nodes. Thus, P2P-based content delivery avoids potential server overload and network congestion by distributing work and content among participating peer nodes.

A peer node can be any device capable of receiving or transmitting data and participating in a P2P network, such as a cell phone, a personal data assistant (PDA), or a laptop computer. The P2P network 202 can be formed as a logical layer over an existing network infrastructure, such as the Internet or a wireless cellular network, which can be implemented in accordance with the Transmission Control Protocol/Internet Protocol (TCP/IP), such as described in W. R. Stevens, "TCP/IP Illustrated," Vol. 1, Ch. 1 et seq., Addison-Wesley (1994), the disclosure of which is incorporated by reference. Other network infrastructures are possible.

The P2P overlay network 202 uses widely-available one-to-one packet-based communication channels. The P2P overlay network 202 is an application-layer solution based on transportation layer protocols, such as the User Diagram Protocol (UDP) or the Transmission Control Protocol (TCP). Other network implementation or protocols are possible. The P2P network 202 uses unicast packet forwarding across participating nodes, called overlay nodes or peer nodes, and provides multicasting by copying and relaying data among the nodes. An exemplary peer node is described in X. Zhang et al., "Coolstreaming/DONet: A Data-driven Overlay Network for Peer-to-Peer Live Media Streaming," INFOCOM 2005, 24th Ann. Jt. Conf. of the IEEE Comp. and Comm. Societies, Proc. IEEE Vol. 3, 13-17, pp. 2102-2111 (March 2005), the disclosure of which is incorporated by reference.

The originating node 210 sends media content to neighboring P2P nodes. A directory server 212 maintains a list of peer nodes. When joining the P2P network 202, a new peer node contacts the directory server 202 to request a list of peer nodes that transiently stage data for the content, such as a video file or a media stream.

The content passes from node to node via intermediate communication links and propagates to an end host 206. In one embodiment, a P2P engine 222 within the end host 206 is responsible for requesting a list of partner peer nodes, receiving data from multiple partner peer nodes, and transmitting locally stored data to other peer nodes. The P2P engine 222 is in communication with a local server 224, which channels the received data to a media player 220 that presents the streaming media content to a user 208. The local server 224 allows the host 206 to use most conventional media-presentation applications, which are capable of playing content directly from a location identified, for example, by a Uniform Resource Locator (URL).

Figure 3:
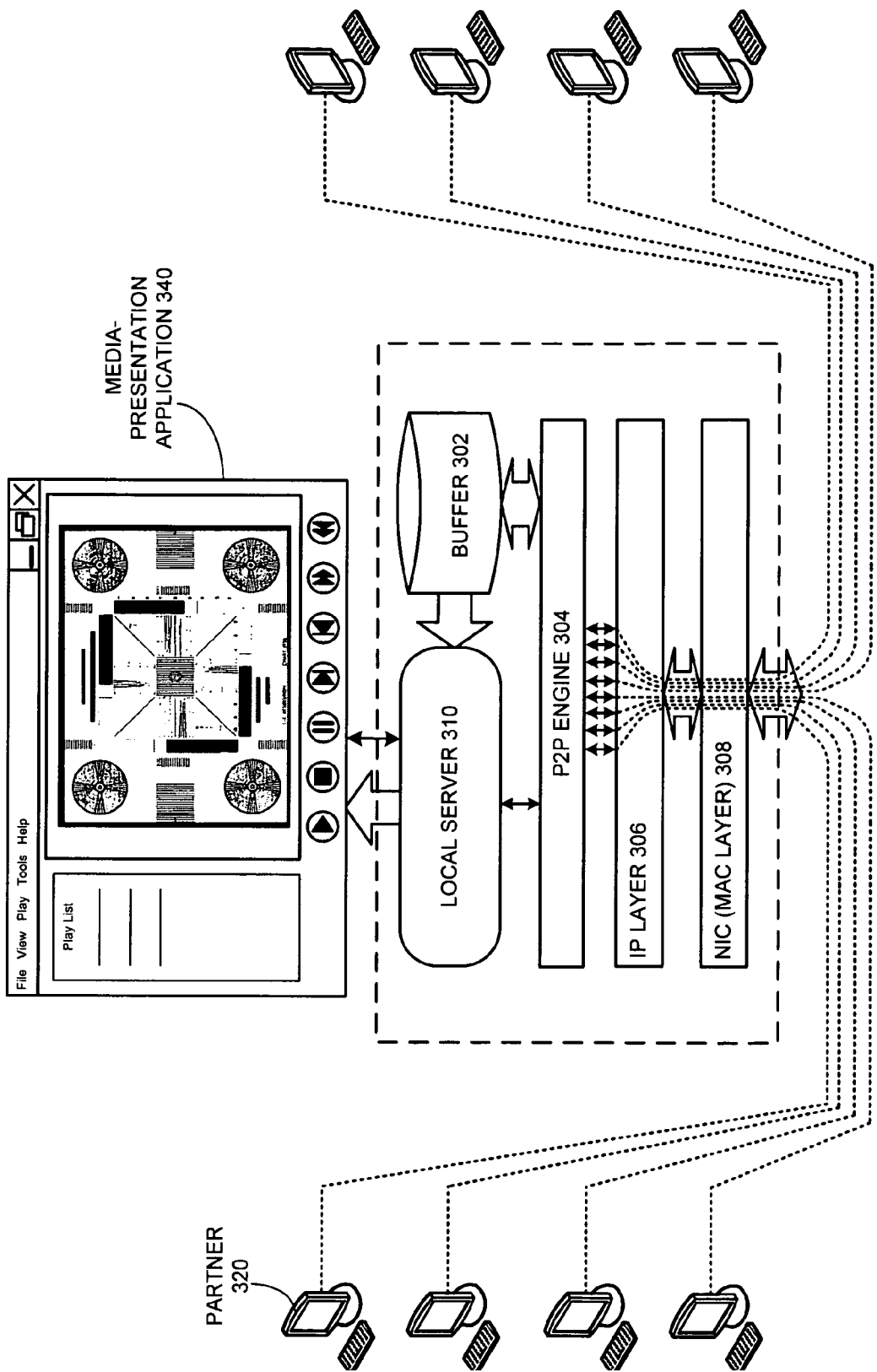
FIG. 3 is a block diagram showing an exemplary architecture of a host facilitating a P2P engine in presenting streaming media content received over a P2P network, in accordance with one embodiment.

FIG. 3 is a block diagram illustrating an exemplary architecture of a host facilitating a P2P engine for presenting streaming media content delivered over a P2P network. An end host system includes a buffer 302, a P2P engine 304, and a network interface card that implements a Medium Access Control (MAC) layer 306. The P2P engine 304 communicates with other peer nodes through an Internet Protocol (IP) layer 308.

When a node issues a command to request content, the P2P engine 304 contacts a directory server to receive a list of partner peer nodes that transiently stage the content. The P2P engine 304 initializes a P2P session with multiple partner peer nodes, such as partner peer node 320, and requests data from the partner peer nodes. The P2P engine 304 subsequently starts receiving data from the partner peer nodes and stores the received data in a buffer 302. Conventionally, the P2P engine 304 requests data from a partner peer node in the same order in which the data arrives at the partner peer node, which causes loss of synchronization between the requesting peer node and the sending peer node. According to one embodiment, the P2P engine 304 requests the most recent data available in the partner peer node's buffer to attain the best-case synchronization. The P2P engine 304 can also retrieve the data stored in the buffer 302 and share the data with other peer nodes.

The end host includes a local server 310, which fetches data from the buffer 302 and channels the data to a media-presentation application 330. When sufficient data has been received and stored in the buffer 302, the local server 310 calls the media-presentation application 330 to present the media content.

Streaming media content, such as a real-time video stream, is divided into consecutively numbered segments, which can be of uniform length and with consecutive sequence numbers. Each local host also implements a logical sliding window to buffer a consecutive block of received segments. To facilitate smooth playback and advance the streaming of media, local hosts only request segments whose numbers fall within the sliding window when requesting data from partner peer nodes. Each peer node advances the sliding window periodically over time. By choosing a proper sliding-window size, a local host can allocate sufficient time for receipt of segments and to advance the media, while minimizing the affect caused by a potentially missing segment.

Sliding-Window Buffer for Real-Time Content Streaming

Figure 4A:
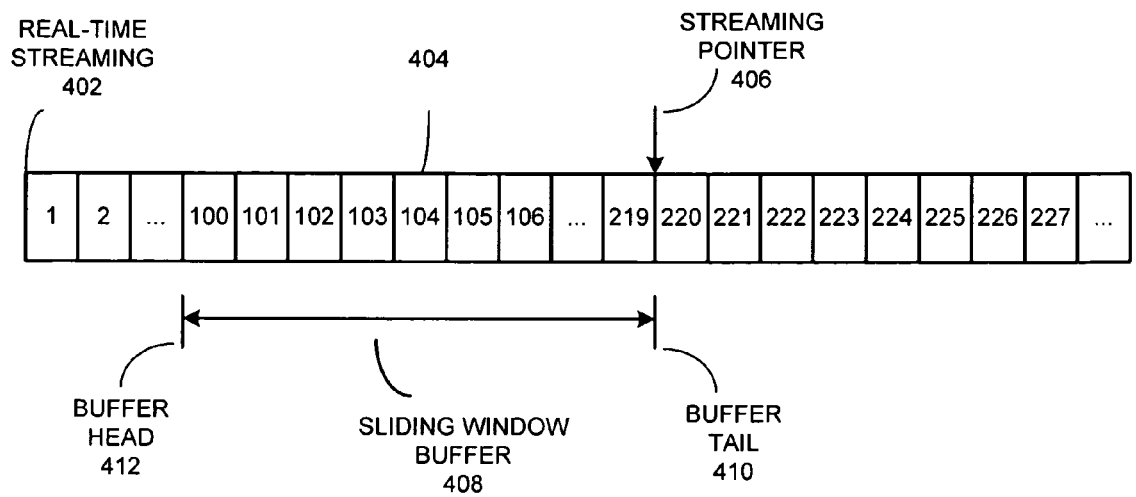
FIG. 4A is a block diagram showing a peer node maintaining a sliding-window buffer, which is filled with streaming content segments.

FIG. 4A is an exemplary block diagram of a sliding-window buffer for transiently staging real-time streaming content segments. An originating node injects a piece of streaming content 402 containing consecutive segments 404 into the P2P network at a constant streaming rate. A streaming pointer 406 indicates the most recent segment injected by the originating node. Each peer node in the P2P network maintains a sliding-window buffer 408. A buffer tail 410 indicates the most recent and a buffer head 412 indicates the least recent segments available in the buffer. The buffer tail 410 and buffer head 412 indicate the segments available in the sliding-window buffer 408. In this example, the sliding-window buffer 408 has a size of 120 segments, and the buffered segments' current positions are (100, 219), wherein the first and second numbers indicate the segment sequence numbers of the buffer head and tail, respectively.

For the media player to play content smoothly, the effective data rate between the requesting peer node and the partner peer nodes must equal or be larger than the data rate of media playback, also referred to as the "streaming rate." As a media player draws data, the buffer 408 is advanced at the streaming rate. For real-time content delivery, maintaining synchronization between the content received at the requesting peer node and the content stored at the partner peer nodes is critically important, because any substantial time lag can accumulate from one peer node to another and eventually cause significant playback delay, preventing real-time streaming.

Figure 4B:
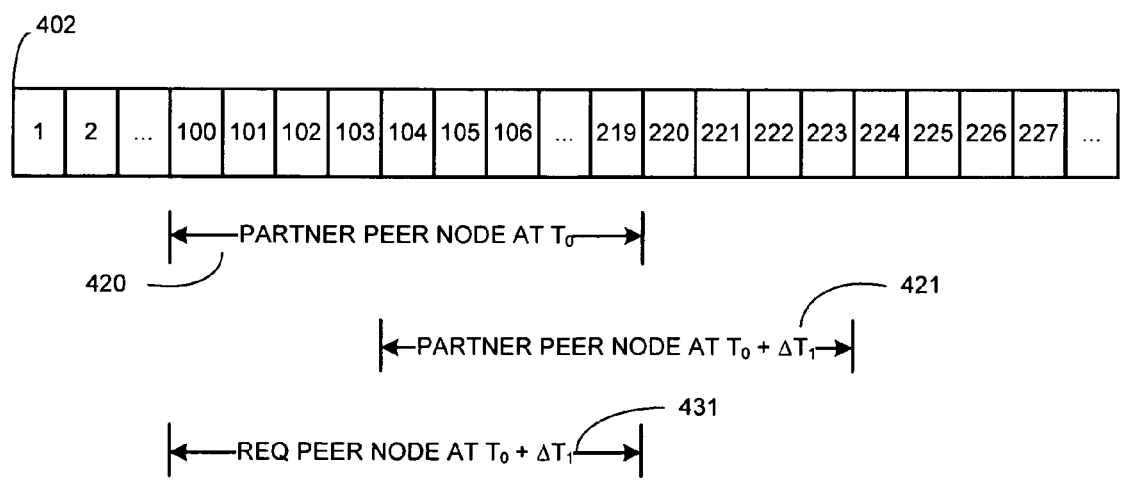
FIG. 4B is a block diagram showing a prior-art buffering method that results in aggravated loss of synchronization between a requesting peer node and a partner peer node.

FIG. 4B is a block diagram showing a prior-art buffering method that results in aggravated loss of synchronization between the requesting peer node and the partner peer nodes. At time $T_0$, a partner peer node's sliding window 420 is at position (100, 219). A requesting peer node requests the least recent segment available in the sliding window 420, segment 100, from the partner peer node. After receiving segment 100, the requesting peer node appends segment 100 to the local buffer tail and requests the next available segment in the sliding window 420, segment 101. The process repeats until the requesting peer node's sliding window 431 is full at time $(T_0+\Delta T)$. At time $(T_0+\Delta T)$, the partner peer node's sliding window 421 advances to a new position (104, 223). Time interval $\Delta T$ represents the startup latency at the requesting peer node. As a result, time lag of four segments occurs between partner peer node and the requesting peer node. This time lag accumulates when the segments are distributed to other peer nodes in the P2P network, and can impact the P2P network's ability to effectively share and relay content data.

Figure 4C:
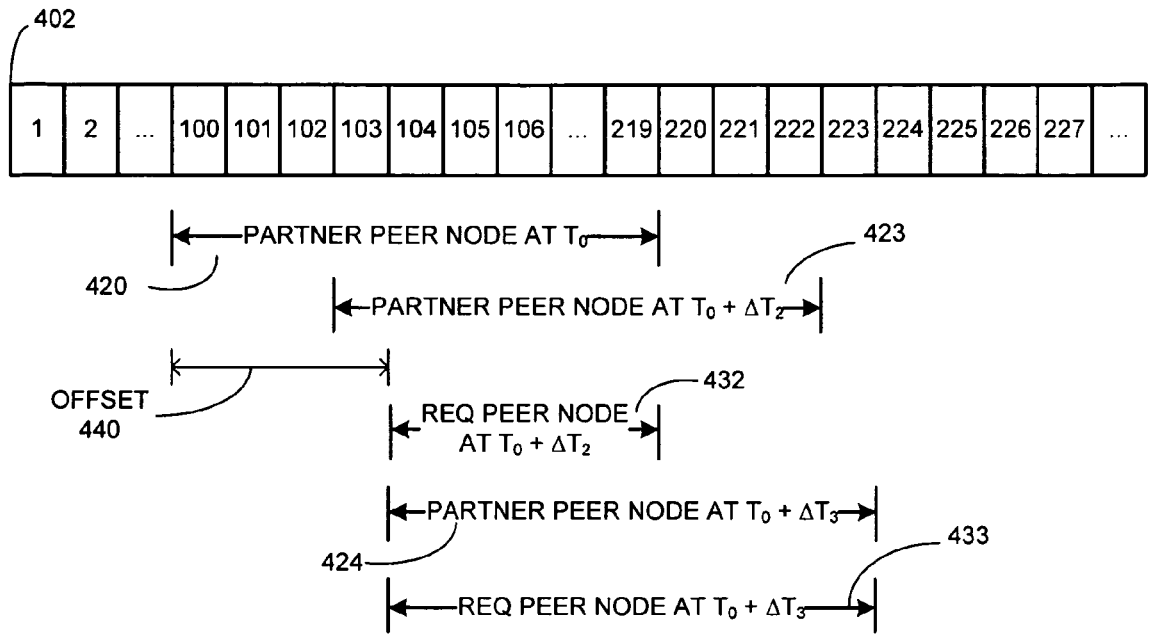
FIG. 4C is a block diagram showing a buffering method where the requesting peer node estimates an offset when requesting segments from the partner peer node.

Estimating a forward offset beforehand helps to compensate for the aforementioned time lag. FIG. 4C illustrates a block diagram showing an offset-estimation buffering method. Before sending requests to a partner peer node, a requesting peer node first estimates a forward offset 440 of segments based on current network condition, such as estimated or observed round-trip delay. The requesting peer node subsequently requests content segments from the partner peer node by factoring the offset into receipt time. In this example, at time $T_0$, the sliding window 420 of the partner peer node is at the position (100, 219). The requesting peer node requests the least recent segment, segment 104, in the sliding window 420 advanced by the extra segments to fill the offset, which are three segments after the current buffer head of the partner peer node. After receiving segment 104, the requesting peer node appends segment 104 to the local buffer and requests the next segment, segment 105.

This process is repeated until the requesting peer node has fetched segment 219, which is the original buffer tail of the partner peer node at time $T_0$. At time $(T_0+\Delta T)$, the requesting peer node's sliding window 432 is at position (104, 219), and contains all of the segments, except the offset segments, in the partner peer node's sliding window 420 at time $T_0$. During the time interval $\Delta T$, the partner peer node receives three additional segments from the P2P network and advances its sliding window 423 to a new position (103, 222). The requesting peer node continues to request segment 220 while the partner peer node receives one more segment, segment 223, and advances its sliding window to position (104, 223). At time $(T_0+\Delta T')$, the requesting peer node's sliding window 433 becomes synchronized with the partner peer node's sliding window 424.

Provided the estimation of forward offset is accurate and network condition remains unchanged, playback at the requesting peer node is synchronized to playback at the partner peer node, but without the increased startup latency. Accurate offset estimation is difficult due to changing network conditions. As a result, loss of synchronization can still occur and accumulate at different peer nodes.

Figure 4D:
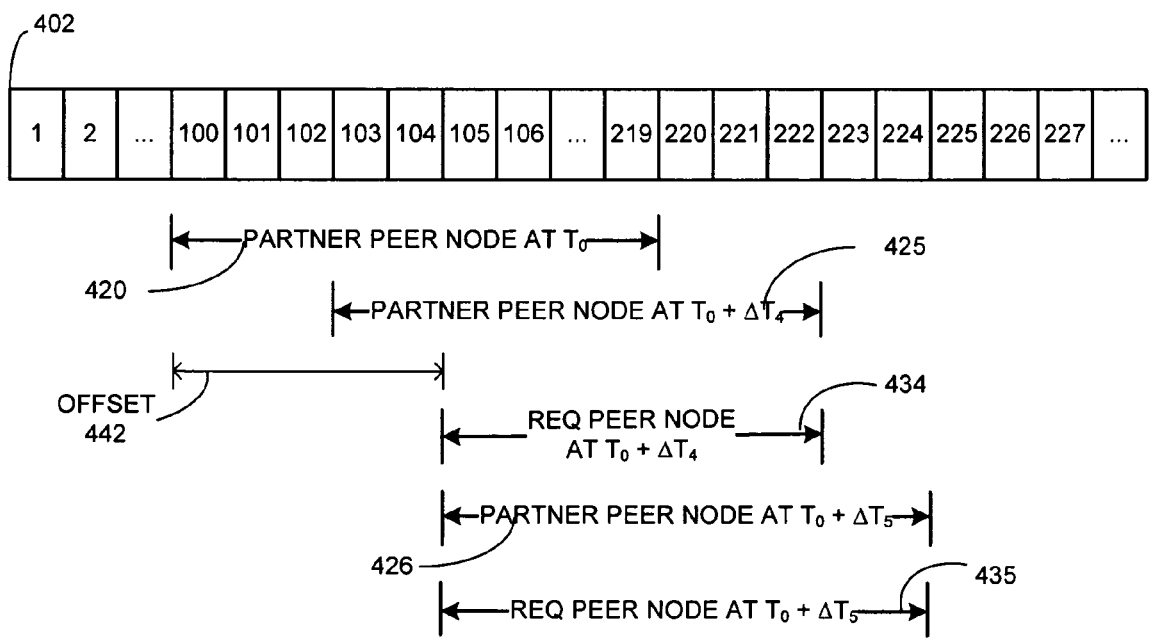
FIG. 4D is a block diagram showing the offset-estimation buffering method where the estimated offset is too large.

FIG. 4D illustrates a scenario of the offset-estimation buffering method where the estimated offset is too large, which results in unnecessary extra delay. In this example, at time $T_0$, the sliding window 420 of the partner peer node is at position (100, 219), and the requesting peer node estimates a forward offset 442 of five segments. The requesting peer node starts by requesting segment 105 based on the offset 442. Assume that at this point, the network condition has improved and the effective data rate between the two peer nodes has increased. The requesting peer node repeats the requesting process until the sliding window 434 contains segment 222, which is the buffer tail of the partner peer node at time $(T_0+\Delta T)$.

Since the requesting peer node's sliding window 434 is not yet full, the requesting peer node continues to request additional segments, which are to be received by the partner peer node from the P2P network. These additional segments, however, arrive at the partner peer node at the streaming rate. Consequently, the requesting peer node can only receive these segments at the same streaming rate, instead of at the higher effective data rate now available between the two peer nodes. At time $(T_0+\Delta T')$, the requesting peer node's sliding-window buffer 435 fills and synchronizes with the partner peer node's sliding-window buffer 426. However, between time instances $(T_0+\Delta T)$ and $(T_0+\Delta T')$, the requesting peer node receives the additional segments at a slower streaming rate than the effective data rate available between the two nodes. Hence, the startup latency $(\Delta T')$ is larger than the startup latency as is shown in FIG. 4B and FIG. 4C.

Figure 4E:
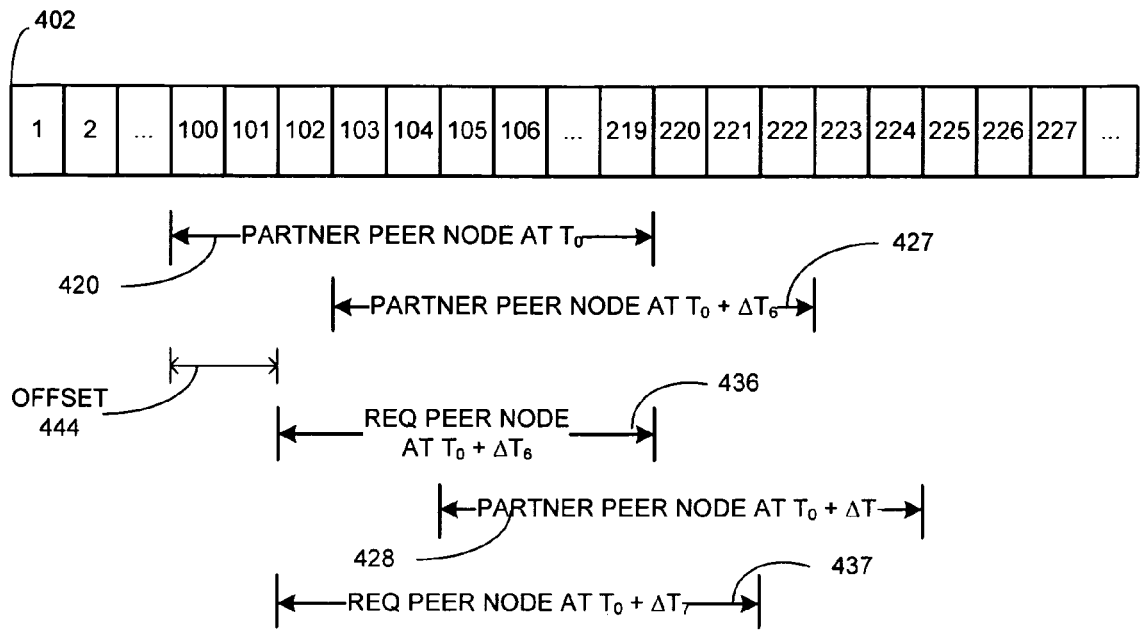
FIG. 4E is a block diagram showing the offset-estimation buffering method where the estimated offset is too small.

FIG. 4E illustrates a scenario of the offset-estimation method, where the estimated offset is too small, which results in loss of synchronization. In this scenario, at time $T_0$, the partner peer node's sliding window 420 is at position (100, 219), and the requesting peer node estimates that the offset 444 is two segments. The requesting peer node starts the request process with segment 102, and repeats this process until the buffer 436 obtains segment 219, which is the buffer tail of the partner peer node at time $T_0$. However, during the time interval $\Delta T$, the network condition has worsened, resulting in a decreased data rate between the two nodes, and the partner peer node has received three additional segments, 220, 221, and 222. As a result, there is a three-segment time lag between the buffer tails of the two nodes. At time ($T_0$+ $\Delta T'$), the requesting peer node filled its sliding window 437, but the time lag remains.

Synchronous Buffering Mechanism

Figure 4F:
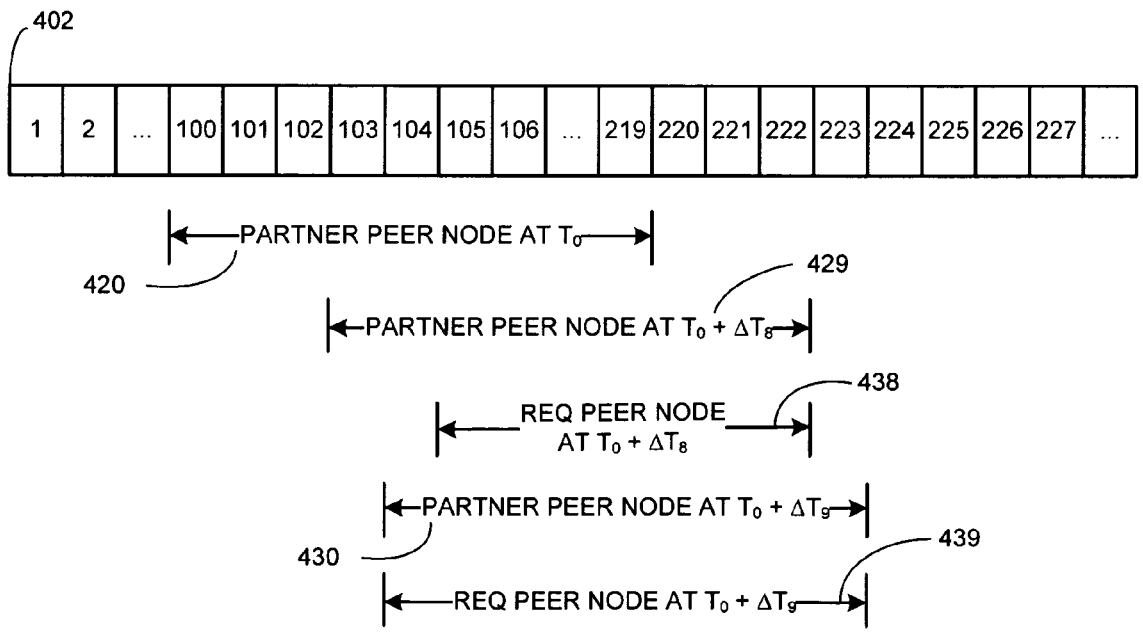
FIG. 4F is a block diagram showing a synchronous buffering method, in accordance with one embodiment.

FIG. 4F illustrates a synchronous buffering method for real-time streaming content in a P2P network to improve inter-peer-node synchronization, in accordance with one embodiment. In general, the requesting peer node sends requests to the partner peer node, and the partner peer node responds with segments. Each request contains a first sequence number and a second sequence number, which as a pair indicate the status of the requesting peer node's buffer. When the requesting peer node's buffer is empty, the first and second sequence numbers are set to predetermined values, such as (0, 0). When the buffer is partly full, the sequence number pair can be (buffer tail+1, buffer head−1).

In response, the partner peer node sends the most recent segment available in its buffer when the request indicates that the requesting peer node's buffer is empty. If the request indicates that the requesting peer node's buffer is partly full, the partner peer node determines whether the segment with the first sequence number contained in the request is available in the partner peer node's buffer. If available, the partner peer node transmits that segment to the requesting peer node. Otherwise, the partner peer node transmits the segment with the second sequence number contained in the request.

At time $T_0$, the partner peer node's buffer 420 is at position (100, 219). The requesting peer node sends a request with sequence numbers (0, 0) to the partner peer node. Since both sequence numbers are zero, indicating that the requesting peer node's buffer is empty, the partner peer node sends the most recent segment available in its buffer 420, which is segment 219, to the requesting peer node. After receiving segment 219, the requesting peer node appends segment 219 to the local buffer tail and sends a request with two new sequence numbers (220, 218). These two sequence numbers indicate the immediate segments before and after the segments currently present in the requesting peer node's buffer. If the partner peer node has received the next segment 220, the partner peer node sends segment 220 to the requesting peer node. Otherwise, the partner peer node sends segments 218 to the requesting peer node.

At time ($T_0$+$\Delta T$), the partner peer node's buffer 429 has advanced to position (103, 222), and the requesting peer node's buffer 438 is at position (105, 222). The buffer tails of both nodes are synchronized. At time ($T_0$+$\Delta T'$), the requesting peer node's buffer 439 is full and synchronized with the partner peer node's buffer 430. The two nodes differ by at most one segment time delay, and the startup latency is $\Delta T'$, which equals the startup latency in the case shown in FIG. 4B and FIG. 4C. The nodes thus effectively maintain a synchronization between without increasing the startup latency.

Figure 5:
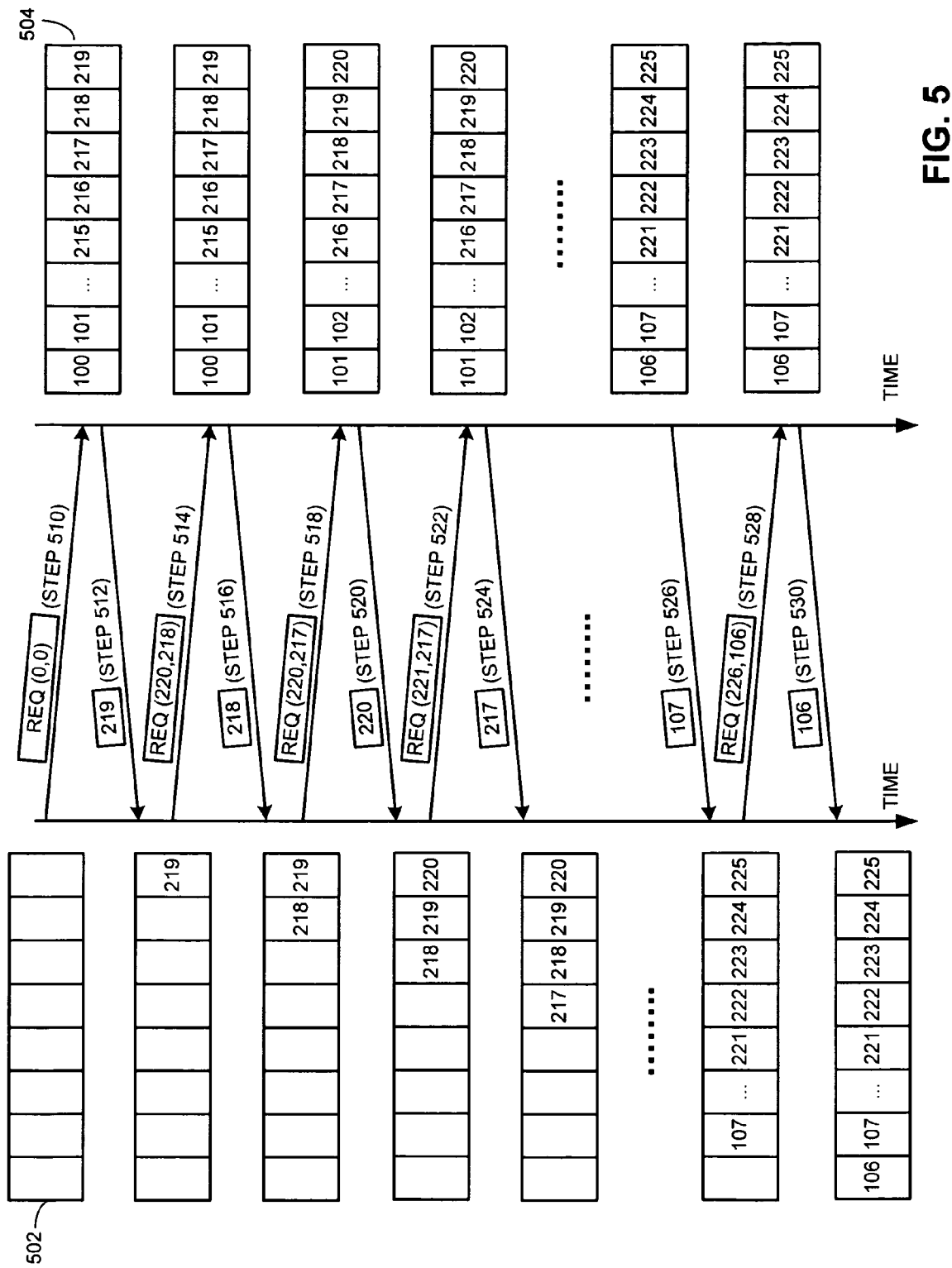
FIG. 5 is a time-space diagram showing an example of a peer node requesting and receiving segments from a partner peer node, in accordance with one embodiment.

FIG. 5 depicts a corresponding time-space diagram for the synchronous buffering method described with reference to FIG. 4F. At the beginning of the process, a partner peer node's buffer 504 is at the position (100, 219). Since the requesting peer node's buffer 502 is empty, the requesting peer node sends a request with sequence numbers (0, 0) (step 510). Since both sequence numbers are zero, the partner peer node responds with the most recent segment in its buffer, which is the buffer tail, segment 219 (step 512). After receiving segment 219, the requesting peer node appends segment 219 to its buffer tail, and sends another request with sequence numbers (220, 218) (step 514).

The partner peer node determines whether the segment with the first sequence number 220 contained in the request is available. Since segment 220 is not available, the partner peer node further determines whether the segment with the second sequence number 218 is available. Since segment 218 is available, the partner peer node sends segment 218 to the requesting peer node (step 516). The requesting peer node inserts segment 218 before its buffer head, which is segment 219, and sends the next request with sequence numbers (220, 217) (step 518).

When the partner peer node receives the request with sequence numbers (220, 217), a new segment 220 has just arrived at the partner peer node. Accordingly, the partner peer node sends segment 220. This process is repeated with steps 526, 528 and 530, until the requesting peer node's sliding-window buffer 502 is full and synchronizes with the partner peer node's buffer 504. In contrast to conventional methods that fill the buffer with the least recent segments first, the buffer 502 is filled with the most recent segments first. This synchronous buffering method ensures synchronization between the requesting and partner peer nodes.

In further embodiments, the requesting peer node can request more than one segment at a time. For example, the requesting peer node can request multiple segments from the partner peer node by indicating the number of segments to be received in the request. In a still further embodiment, the number of segments to be received can be predetermined. Other request formats are possible, so long as the request indicates the state of the requesting peer node's buffer.

Figure 6:
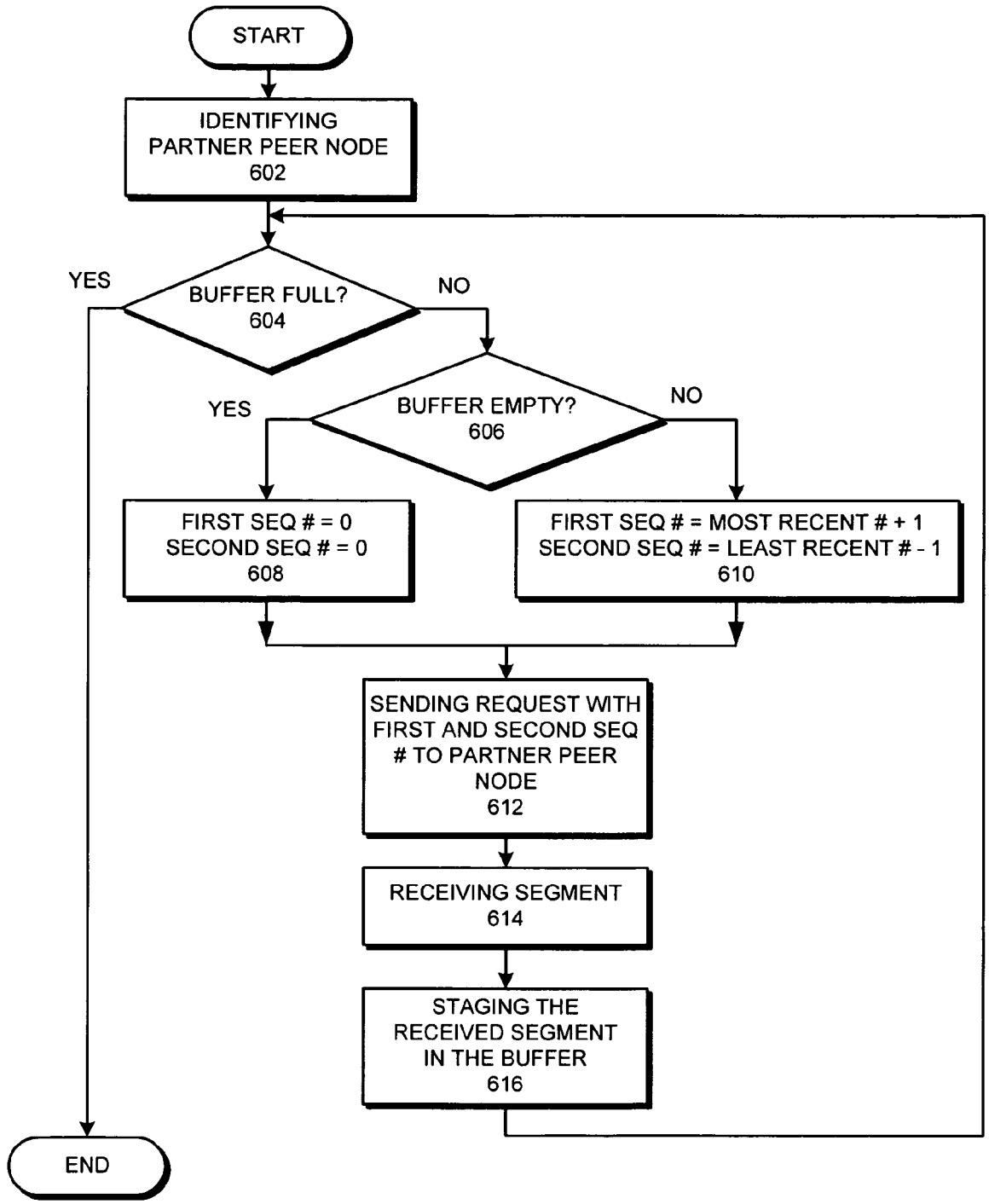
FIG. 6 is a flow chart showing a process performed by a peer node requesting content segments from a partner peer node and transiently staging the received segments in a buffer, in accordance with one embodiment.

FIG. 6 is a flow chart showing the process performed by a peer node requesting content segments from a partner peer node and transiently staging the received segments in the buffer, in accordance with one embodiment. The requesting peer node identifies a partner peer node that transiently stages the content segments (step 602). The requesting peer node further determines whether the local buffer is full (step 604). If full, the system resumes normal playback.

Otherwise, the requesting peer node determines whether the local buffer is empty (step 606). If empty, the requesting peer node sets the first and the second sequence numbers in the request to predetermined values, such as (0, 0) (step 608). If the local buffer is not empty, the requesting peer node sets the first sequence number to (the most recent sequence number+1), that is, (buffer tail+1). The second sequence number is set to (the least recent sequence number−1), that is (buffer head−1) (step 610). Other non-zero values are possible. The requesting peer node subsequently sends the request with both sequence numbers to the partner peer node (step 612), receives the requested segment (step 614), and transiently stages the received segment in the local buffer (step 616). This process is repeated until the local buffer at the requesting peer node is full (step 604).

Figure 7:
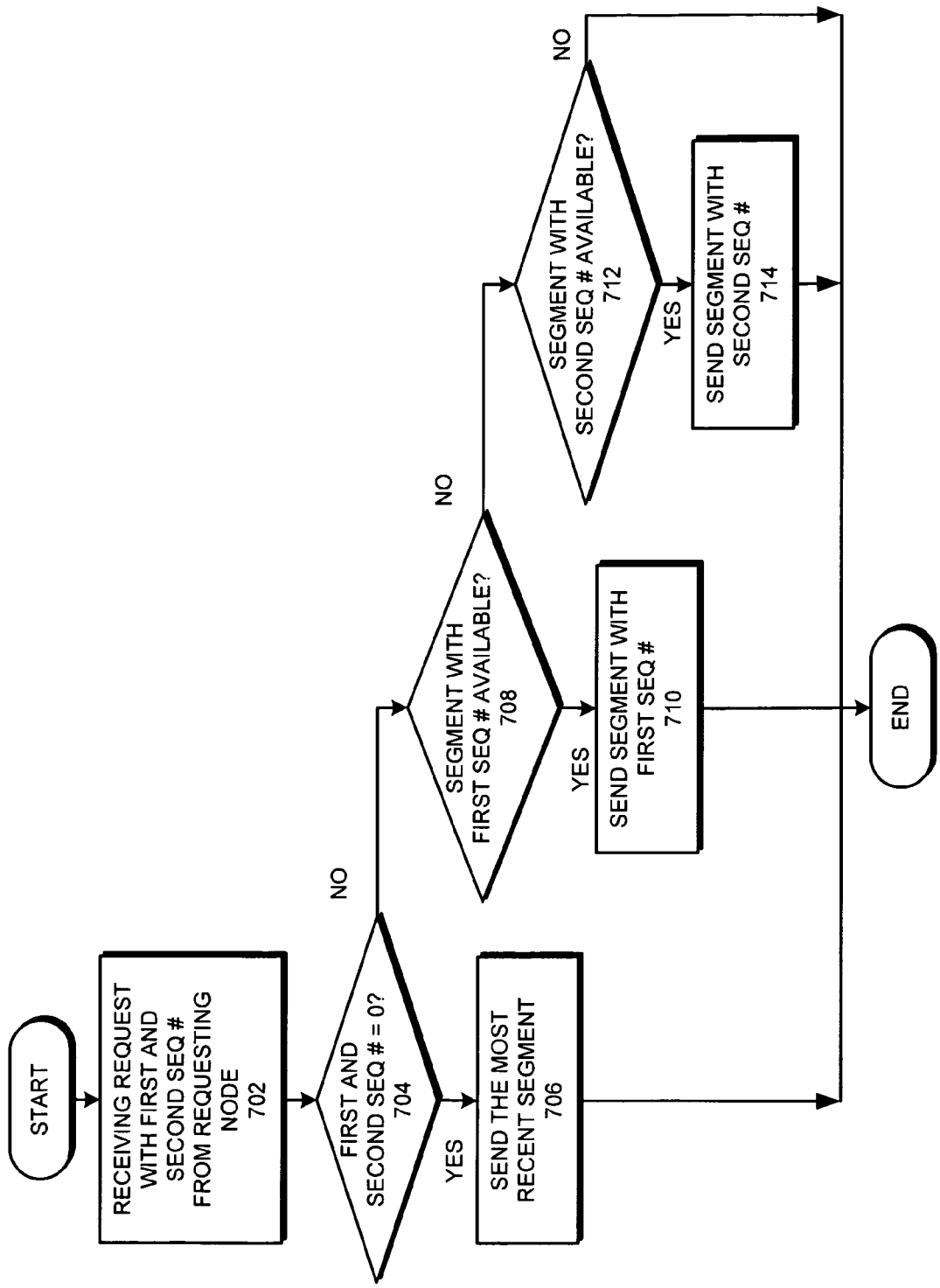
FIG. 7 is a flow chart showing a process performed by a partner peer node receiving a request and sending the requested segment to the requesting peer node, in accordance with one embodiment.

FIG. 7 is a flow chart showing the process performed by a partner peer node receiving a request and sending the requested segment to the requesting peer node, in accordance with one embodiment. A partner peer node receives a request containing the first and the second sequence numbers from a requesting peer node (step 702). The partner peer node determines whether the first and second sequence numbers equal the predetermined values, such as (0, 0), which indicates whether the requesting peer nodes' buffer is empty (step 704). If equal, the partner peer node sends the most recent segment in its buffer to the requesting peer node (step 706).

If the first and the second sequence numbers are not equal to the predetermined values, the partner peer node further determines whether a segment with the first sequence number is available in its buffer (step 708). If available, the partner peer node sends this segment to the requesting peer node (step 710). If not available, the partner peer node determines whether a segment with the second sequence number is available (step 712). If available, the partner peer node sends this segment to the requesting peer node (step 714). If not, the system resumes other operations.

In a further embodiment, the requesting peer node can request segments from a plurality of partner peer nodes that transiently stage the content segments. Depending upon the network conditions between the requesting peer node and each of the partner peer nodes, the requesting peer node can interleave the requested sequence numbers for each partner peer node. For instance, the requesting peer node can request segments from two partner peer nodes, partner peer node A and partner peer node B, whose buffers are both at the position (100, 219). The requesting peer node can request segments with odd sequence numbers, such as 221, 219, 217, and 215, from partner peer node A, and request segments with even sequence numbers, such as 220, 218, 216, and 214, from partner peer node B. Other overlapped or interleaved request schemes are possible.

While the invention has been particularly shown and described as reference to the embodiments thereof, those skilled in the art will understand that the foregoing and other changes in form and detail may be made therein without departing from the scope of the invention.

What is claimed is:

1. A method for buffering streaming content in a peer-to-peer overlay (P2P) network, the method comprising:
   identifying a partner peer node that transiently stages streaming content segments;
   determining a status of a local buffer to transiently stage the content segments;
   sending a request that comprises the buffer status; and
   receiving a segment that is the most recent segment available in the partner peer node's buffer, but not present in the local buffer; and
   transiently staging the received segment into the local buffer, wherein transiently staging the received segment in the buffer further comprises:
      appending the received segment after the segments currently present in the buffer when the received segment is more recent than the segments in the buffer; and
      appending the received segment before the segments currently present in the buffer when the received segment is less recent than the segments in the buffer.

2. The method of claim 1, further comprising:
   including in the request sequence numbers for most recent and least recent segments currently present in the buffer when the buffer is partly full; and
   setting the sequence numbers included in the request to predetermined values when the buffer is empty.

3. The method of claim 1, further comprising:
   indicating a number of segments to be received in the request; and
   receiving additional content segments from the partner peer node in response to the request.

4. The method of claim 1, further comprising:
   identifying a plurality of partner peer nodes that transiently stage segments for the streaming content; and
   requesting and receiving the segments from the partner peer nodes, wherein the sequence numbers of requested segments are interleaved for each partner peer node.

5. A system for buffering streaming content in a peer-to-peer overlay (P2P) network, the system comprising:
   an identification mechanism configured to identify a partner peer node that transiently stages streaming content segments;
   a determination mechanism configured to determine a status of the local buffer;
   a request mechanism configured to send a request that comprises the buffer status;
   a receiving mechanism configured to receive a segment that is the most recent segment available in the partner peer node's buffer, but not present in the local buffer; and
   a local buffer configured to transiently stage the received segment into the local buffer, wherein the local buffer further comprises an segment-insertion mechanism configured to append the received segment after the segments currently present in the buffer when the received segment is more recent than the segments in the buffer, and to append the received segment before the segments currently present in the buffer when the received segment is less recent than the segments in the buffer.

6. The system of claim 5, wherein the request mechanism comprises:
   a sequence-number inclusion mechanism configured to include in the request sequence numbers for most recent and least recent segments currently present in the buffer when the buffer is partly full; and
   a sequence-number modification mechanism configured to set the sequence numbers included in the request to predetermined values when the buffer is empty.

7. The system of claim 5, wherein the request mechanism comprises:
   a segment-indication mechanism configured to indicate a number of segments to be received in the request; and
   wherein the receiving mechanism is configured to receive additional content segments from the partner peer node in response to the request.

8. The system of claim 5, wherein the identification mechanism is configured to identify a plurality of partner peer nodes that transiently stage segments for the streaming content;
   wherein the request mechanism is configured to request the segments from the partner peer nodes; and
   wherein the sequence numbers of requested segments are interleaved for each partner peer node.

* * * * *